United States Patent [19]

Foust

[11] Patent Number: 4,912,925
[45] Date of Patent: Apr. 3, 1990

[54] ROCKET ENGINE WITH REDUNDANT CAPABILITIES

[75] Inventor: Robert R. Foust, Palm Beach, Fla.

[73] Assignee: United Technologies Corporation, Hartford, Conn.

[21] Appl. No.: 784,625

[22] Filed: Oct. 4, 1985

[51] Int. Cl.$^4$ ............................................. F02K 9/44
[52] U.S. Cl. ........................................ 60/259; 60/260; 244/135 C; 244/172
[58] Field of Search ................ 60/259, 260, 258, 257, 60/240, 243, 39.461, 734, 39.091, 39.094; 244/172, 135 R, 135 C; 137/599

[56] References Cited

U.S. PATENT DOCUMENTS

| | | | |
|---|---|---|---|
| 2,686,561 | 8/1954 | Isreeli et al. | 60/243 |
| 2,771,130 | 11/1956 | Best Jr. | 60/243 |
| 3,937,014 | 2/1976 | Plant | 60/243 |
| 4,073,138 | 2/1978 | Beichel | 60/259 |
| 4,171,615 | 10/1979 | Stewart et al. | 60/259 |
| 4,500,268 | 2/1985 | Sundberg et al. | 417/214 |
| 4,553,914 | 11/1985 | Noell et al. | 417/319 |

FOREIGN PATENT DOCUMENTS

| | | | |
|---|---|---|---|
| 1098351 | 7/1955 | France | 244/135 C |
| 2051246 A | 1/1981 | United Kingdom | 244/172 |

Primary Examiner—Donald E. Stout
Attorney, Agent, or Firm—Norman Friedland

[57] ABSTRACT

A redundant rocket engine for high reliability that incorporates a single thrust chamber and its attendent hydrogen and oxygen injectors and provides a pair of independent but indentical engine systems that provide the fuel feed and cooling systems where one system remains in a standby condition until a malfunction occurs while the other system remains operative. The independent systems are comprised of all of the movable parts.

3 Claims, 10 Drawing Sheets

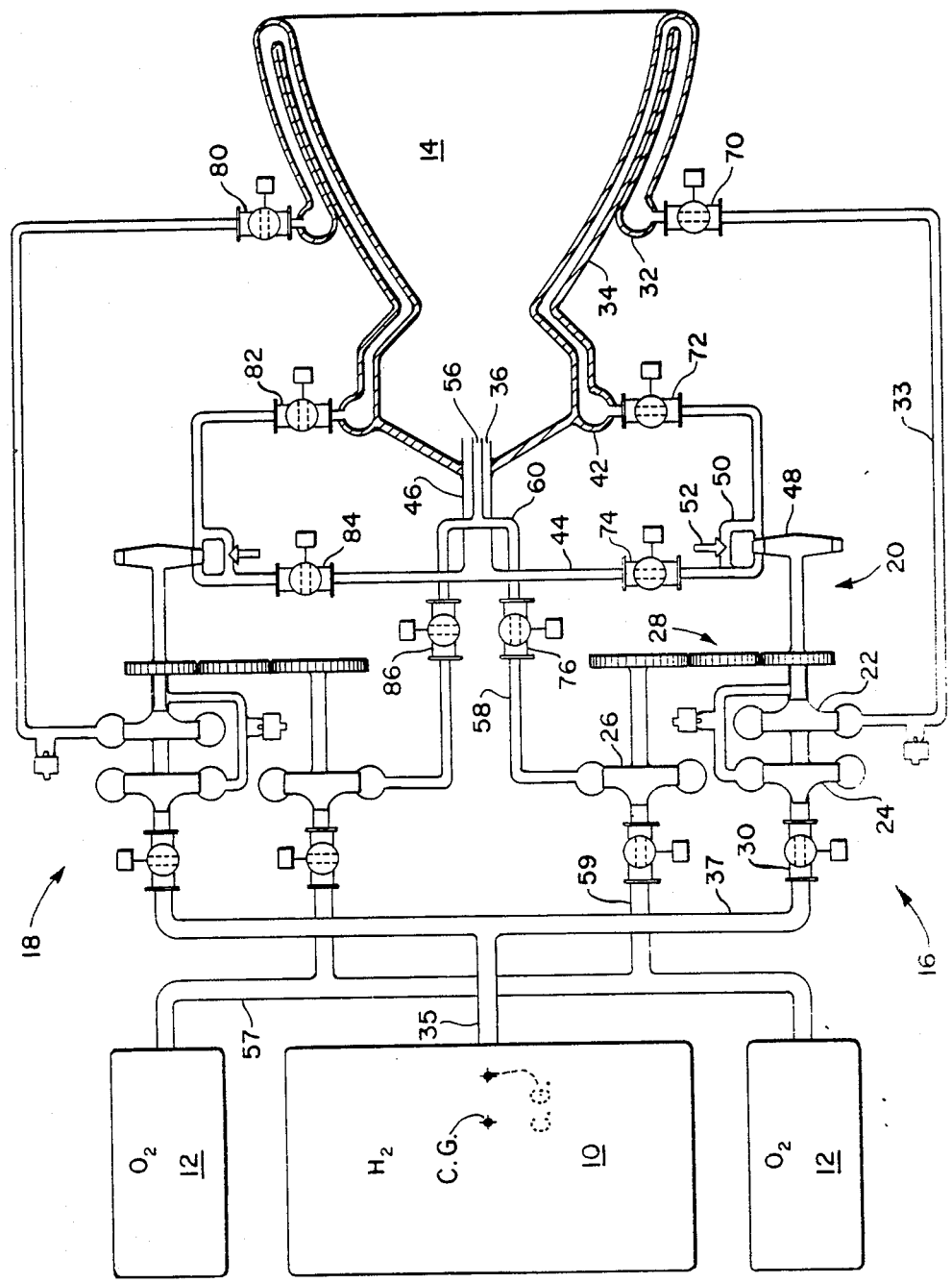

ROCKET ENGINE WITH REDUNDANT CAPABILITIES

DESCRIPTION

1. Technical Field

This invention relates to rocket engines and particularly to the type that utilizes liquid propellants and turbopumps.

2. Background Art

It is, obviously, abundantly important that rocket engines achieve high reliability, particularly when they are employed as the main engine in a reusable vehicle operable from a space station orbiting in outer space. This invention is concerned with an engine or engines that can primarily satisfy the requirements, for example, for what is known as the Orbital Transfer Vehicle (OTV), but may be applied to any application requiring high reliability.

To achieve high reliability, those considered skilled in this field of technology suggest that it is necessary to provide multiple engines with engine out capability. Typically, this approach provides for operation of two engines simultaneously, and in the event of malfunction on one engine rely on the remaining engine to complete the mission at a reduced vehicle thrust.

This system inherently presents certain disadvantages. Because of the additional weight presented by a second engine and associated vehicle systems, the vehicle payload is compromised or the cost for the additional weight would be inherently higher (e.g. additional propellants required to deliver the same payload). Additionally, the complexity of the gimbal actuation system would add to the overall cost. This complexity is aggravated because the location of the center of gravity of the propellants as they are exhausted varies and since neither engine can be mounted in a favorable line of action through the center of gravity (i.e. the resultant thrust of two engines must pass through the e.g.). In the event of malfunction, the remaining engine would have to be repositioned and the connecting propellant supply ducts would require severe sharp bends.

Moreover, the packaging of the hardware of the engines and its attendant components would undoubtedly be compromised due to the space required for the multiple engines. This is accentuated inasmuch as these engines have a significant diameter to provide high specific impulse via large nozzle expansion ratio.

Consideration of the concepts enumerated above and my invention was disclosed at a AIAA/SAE/ASME/ASEE 21st Joint Propulsion Conference on July 8-10, 1985 at Monterey, California and is published in a paper entitled "AIAA-85-1338 RL 10 Derivative Engines for the OTV" by Robert R. Foust, which is incorporated herein by reference.

DISCLOSURE OF INVENTION

I have found that I can provide high reliability and obviate the problems alluded to in the above by providing a single thrust chamber and injector that would be shared by redundant engine components. For example, in this engine system with redundant capabilities the necessary engine components, that is the turbopumps and other moving parts such as the valves, would be duplicated and isolation valves would be incorporated to maintain one set of duplicate parts inoperative while the other set is operational. The isolation valves would thereafter be activated to render the inoperative components operative when there is a malfunction, and the other initially operational components are shut down.

A feature of this invention is to provide an improved liquid propellant, turbopump fed propulsion engine that has redundant capabilities with a single common shared injector and thrust chamber. This configuration compared to a multiple engine concept affords the following advantages but not limited thereto.

(1) Provides a reduction in weight, size and cost.
(2) Contains but one thrust level.
(3) Avoids any thrust offsets.
(4) Simplifies the gimbal actuation that typically is utilized on the vehicle.

Other features and advantages will be apparent from the specification and claims and from the accompanying drawings which illustrate an embodiment of the invention.

BRIEF DESCRIPTION OF DRAWINGS

The sole FIGURE is a schematic illustrating a dual redundant system incorporating this invention.

BEST MODE FOR CARRYING OUT THE INVENTION

While this invention is described in its preferred embodiment to utilize the RL 10 rocket engine manufactured by the Pratt & Whitney Government Products Division of United Technologies Corporation, as will be appreciated by any one skilled in this art, the invention has application to other types of engines. Further, this invention is distinct from those systems that may include limited redundancy typically utilized to provide sufficient functioning to abort a mission and return to a secondary destination or continue the mission at some sacrifice in power or other condition. For example, a redundant system that may carry an emergency fuel control to substitute the main fuel control in the event of a malfunction, or the use of the remaining engine of an aircraft to accommodate an emergency landing when one or more of the multiple engines are shut off. What is deemed an important aspect of this invention is the utilization of the injector and thrust chamber as a common function for dual engine moveable components, and the inclusion of isolation valves strategically located as to allow either of the dual components to operate independently of each other.

As was mentioned earlier, the use of a single thrust chamber and injector, the location of these components can be selected relative to the e.g. of the vehicle which obviously is continuously affected by the reduction of propellants. For discussion purpose and for an understanding of this feature, reference should be made to the sole figure. As noted, the propellant tanks, both liquid oxygen and liquid hydrogen (tanks 10 and 12), are located in proximity to the engine thrust chamber 14. Assume for the sake of this discussion the e.g. lies in coincidence with the centerline of thrust chamber 14. Obviously, when propellants are used, the center of gravity changes, which is considerable when it is considered that the propellant amounts to tens of thousands of pounds while the rocket engine amounts to hundreds of pounds and other vehicle system amount to a few thousand pounds but will remain in the line of coincidence as shown. Where multiple thrust chambers are utilized, obviously the centerline of the thrust chambers are offset relative to the e.g., and as the e.g. moves closer to the engine the angle required to track the e.g.

in event of single engine operation becomes more severe. This not only introduces the complexity to the gimbal system (not shown) but also requires sharp bends on the plumbing.

To best understand the operation of the system reference should be made to the lower half of the schematic generally illustrated by the reference numeral 16, which essentially is the one of the redundant systems, and is shown in the operational mode. The other of the dual systems is generally illustrated by reference numeral 18 and is shown in the inoperative mode.

As shown, the turbopump 20 comprises the two stage hydrogen pump 22 and 24 and single stage oxygen pump 26 driven through the spur gear system 28.

With the liquid hydrogen inlet shutoff valve 30 and main shutoff valve 74 in the open position, hydrogen is fed to the manifold 32 via conduit 33 supply line 35 and branch line 37 which feeds a plurality of tubes or channels formed on the outer wall 34 of the thrust chamber 14. The tubes (not shown) circumscribe the thrust chamber and are disposed axially relative to the thrust chamber centerline so that flow is forward relative to the hydrogen injector 36. Initially the latent heat of the metal of the tubes and chamber wall is sufficient to change the phase of the liquid hydrogen to gas. Hence, the hydrogen serves to cool the thrust chamber from then on before being injected into the thrust chamber where it combines with the oxygen and fires (an igniter is used, but is not shown for the sake of convenience and simplicity).

As is apparent from the foregoing, the hydrogen gas is fed to the injector 36 via manifold 42, conduits 44 and 46. The energy from the now heated hydrogen gas serves to drive turbine 48 of turbopump 20. A bypass line 50 and a setable valve 52 bypasses the turbine 48 to assure that the thrust is held to a predetermined level.

Oxygen is fed to oxygen injector 56 by the pump 26 and connector conduits 58 and supply line 57, branch lines 59 and 60.

What has been described is the RL 10 engine, and for further details reference is hereby made to that engine.

According to this invention, a plurality of strategically located isolation valves are utilized to render either of the dual systems alternately operative or inoperative. The isolation valves 70, 72 and 76, as noted, are in the opened position, and any suitable commercially available actuator may be utilized to actuate the valves to the open and close position. Further, the particular motive force, electric, hydraulic or pneumatic, may be utilized depending on the particular application. Upon a malfunction, for example, valves 70, 72 and 76, as well as the normal shutoff valve 74 disposed in conduit 44, are positioned to the closed position shutting off the flow of oxygen and hydrogen and ceasing engine operation. Simultaneously or sequentially, the isolation valves 80, 82 and 86 would be actuated to the opened position and the engine would be restarted. Of course, normally closed shutoff valve 84 would also be reopened.

Inasmuch as the dual system 18 is identical to the system 16, for the sake of simplicity and convenience a description thereof is omitted hereinfrom.

As is apparent from the foregoing, all the moveable parts are redundant, and they share the common hydrogen and oxygen injector and thrust chamber. The thrust chamber being already oriented with respect to the ever changing e.g. the complexities associated with an offset engine is obviated.

It should be understood that the invention is not limited to the particular embodiments shown and described herein, but that various changes and modifications may be made without departing from the spirit and scope of this novel concept as defined by the following claims.

I claim:

1. For a space craft vehicle a redundant system including a rocket engine for providing propulsion force, said rocket engine having an injector for feeding oxygen and hydrogen into a thrust producer means consisting of a single thrust chamber, a source of liquid hydrogen and a source of liquid oxygen connected to said injector and being located relative to said thrust chamber so that the center of gravity of said sources is in a predetermined location for each volumetric condition of said sources and bears a given and fixed relationship to the thrust chamber, said rocket engine comprising at least a pair of generally identical independent systems wherein each of said systems includes fluid connection means for conducting oxygen from said source to said oxygen injector and for conducting hydrogen from said source through indirect heat exchange relationship with said thrust chamber and then to said hydrogen injector, turbopump means for flowing the oxygen and hydrogen through said fluid connecting means, said sources being disposed relative to said thrust chamber so that the center of gravity remains substantially in coincidence with the centerline of said thrust chamber as the oxygen and hydrogen is used up.

2. A rocket engine as in claim 1 wherein said connecting means includes isolation valves moveable to an open and closed position and means for moving said isolation valves to either an open or closed position for concommitantly placing one system into operation while rendering the other system inoperative wherein said thrust chamber is producing thrust when the isolation valves of one of said pair of generally identical independent systems is in the open position.

3. A rocket engine as in claim 2 wherein said turbopump means includes a turbine driven by the hydrogen after being in indirect heat exchange relationship with said thrust chamber, a first pump for oxygen and a second pump for hydrogen, and said turbine powering said first pump and said second pump.

* * * * *

UNITED STATES PATENT AND TRADEMARK OFFICE
CERTIFICATE OF CORRECTION

PATENT NO. : 4,912,925
DATED : April 3, 1990
INVENTOR(S) : Robert R. Foust

It is certified that error appears in the above-identified patent and that said Letters Patent is hereby corrected as shown below:

Column 1, line 39, change "e.g." to --c.g.--

Column 2:
    line 50, change "e.g." to --c.g.--
    line 57, change "e.g." to --c.g.--
    line 67, change "to the e.g." to --to the c.g.--;
        change "as the e.g." to --as the c.g.--
    line 68, change "e.g." to --c.g.--
Column 4, line 10, change "e.g." to --c.g.--

Signed and Sealed this

Sixteenth Day of March, 1993

Attest:

STEPHEN G. KUNIN

Attesting Officer      Acting Commissioner of Patents and Trademarks